(12) United States Patent
Lath

(10) Patent No.: US 7,988,324 B2
(45) Date of Patent: *Aug. 2, 2011

(54) LIGHT SYSTEM WITH STACKED LIGHT PIPE STRUCTURE

(75) Inventor: Abhinand Lath, Ann Arbor, MI (US)

(73) Assignee: SensiTile Systems, Ypsilanti, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/482,331

(22) Filed: Jun. 10, 2009

(65) Prior Publication Data

US 2009/0310347 A1 Dec. 17, 2009

Related U.S. Application Data

(63) Continuation of application No. 11/620,536, filed on Jan. 5, 2007, now Pat. No. 7,559,680.

(51) Int. Cl.
*F21V 9/00* (2006.01)
(52) U.S. Cl. .......... 362/231; 362/600; 362/606
(58) Field of Classification Search .......... 362/551, 362/554, 556, 555, 615, 616, 608
See application file for complete search history.

(56) References Cited

U.S. PATENT DOCUMENTS

| | | | |
|---|---|---|---|
| 2,881,976 A | 4/1959 | Greanias | |
| 3,728,521 A | 4/1973 | Borough et al. | |
| 4,120,588 A | 10/1978 | Chaum | |
| 4,302,069 A | 11/1981 | Niemi | |
| 4,468,085 A | 8/1984 | Papuchon et al. | |
| 4,539,625 A | 9/1985 | Bornstein | |
| 4,761,716 A | 8/1988 | Mori | |
| 4,906,837 A | 3/1990 | Doneen et al. | |
| 4,936,649 A | 6/1990 | Lymer et al. | |
| 5,548,490 A | 8/1996 | Smith | |
| 5,726,730 A | 3/1998 | Crawford et al. | |
| 5,897,201 A | 4/1999 | Simon | |
| 6,059,438 A | 5/2000 | Smith | |
| 6,082,886 A | 7/2000 | Stanford | |
| 6,113,255 A | 9/2000 | Shalit | |
| 6,502,950 B2 | 1/2003 | Signer | |
| 6,536,921 B1 | 3/2003 | Simon | |
| 6,672,749 B2 | 1/2004 | Nicholls | |
| 7,229,203 B2 | 6/2007 | Lath | |
| 7,437,033 B1 * | 10/2008 | Efimov | 385/36 |
| 7,520,651 B2 * | 4/2009 | Lath | 362/576 |
| 7,547,128 B2 * | 6/2009 | Lath | 362/576 |
| 2004/0032748 A1 | 2/2004 | Trudeau et al. | |
| 2004/0076017 A1 | 4/2004 | Clapper | |
| 2006/0268564 A1 | 11/2006 | Ruiz | |

* cited by examiner

*Primary Examiner* — Ali Alavi
(74) *Attorney, Agent, or Firm* — Jeffrey Schox

(57) ABSTRACT

The present invention includes decorative, architectural, and building materials and methods of making these materials, using them or both. The present invention relates to an article of manufacture that includes a light source and a substrate with a plurality of volumes of material, where each volume is capable of transmitting light from one location to a second location on a surface of the substrate. The present invention also relates to an article of manufacture having a substrate with a first surface, and a volume of material contained within the substrate and adapted to transmit light from a first location on the first surface to at least a second location. The present invention also relates to methods of making the articles and to methods of transmitting information.

20 Claims, 5 Drawing Sheets

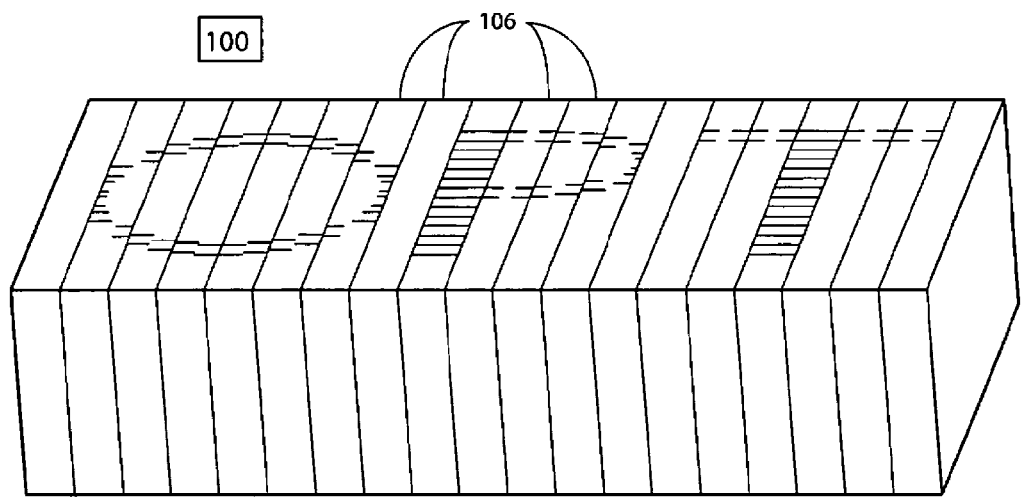
Figure 2A
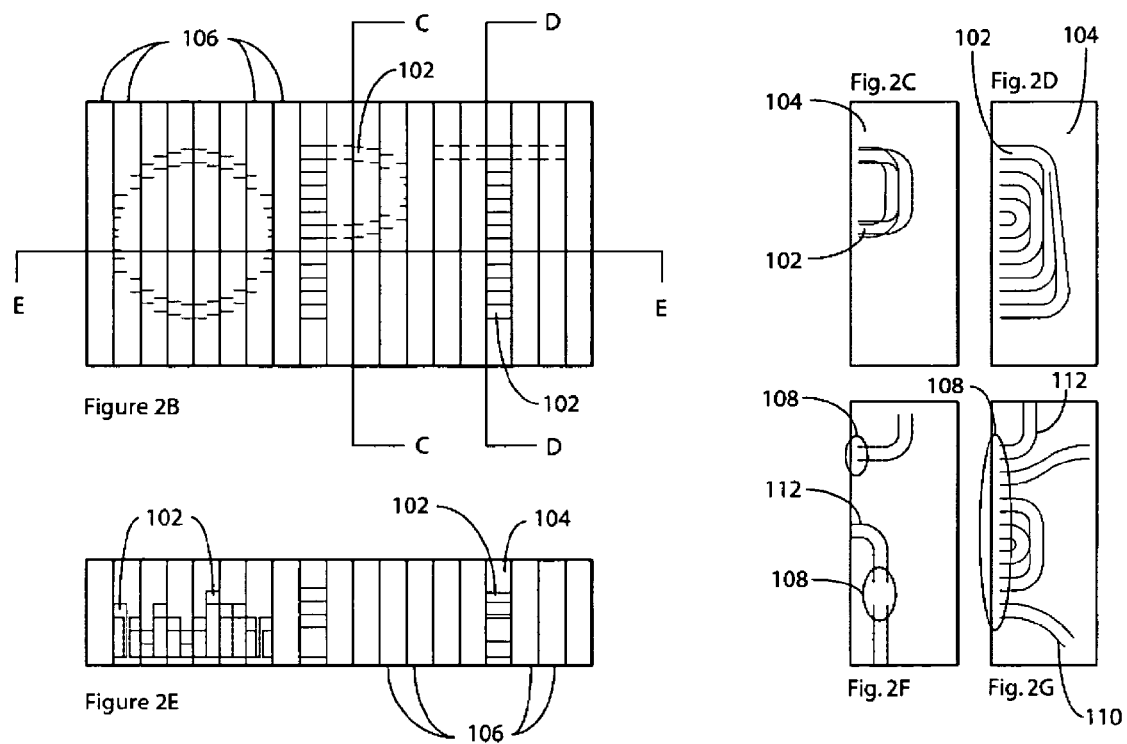
Figure 2B
Figure 2E
Fig. 2C
Fig. 2D
Fig. 2F
Fig. 2G

LIGHT SYSTEM WITH STACKED LIGHT PIPE STRUCTURE

CROSS-REFERENCE TO RELATED APPLICATIONS

This application claims the benefit of U.S. Provisional Application No. 60/756,825, filed 5 Jan. 2006 and entitled "Light System with Stacked Light Pipe Structure," and is a Continuation in Part of U.S. application Ser. No. 10/694,481, filed 27 Oct. 2003 and entitled "Light Pipe Containing Material", which claims the benefit of U.S. Provisional Application No. 60/500,124 filed 4 Sep. 2003. All three applications are incorporated in their entirety by this reference.

TECHNICAL FIELD

This invention relates to decorative, architectural, and building materials and more particularly to materials that include light pipes.

BRIEF DESCRIPTION OF THE FIGURES

FIGS. 1-3 are cross-sectional views of different variations of the preferred embodiment of the invention.

DESCRIPTION OF THE PREFERRED EMBODIMENTS

Figure 1:
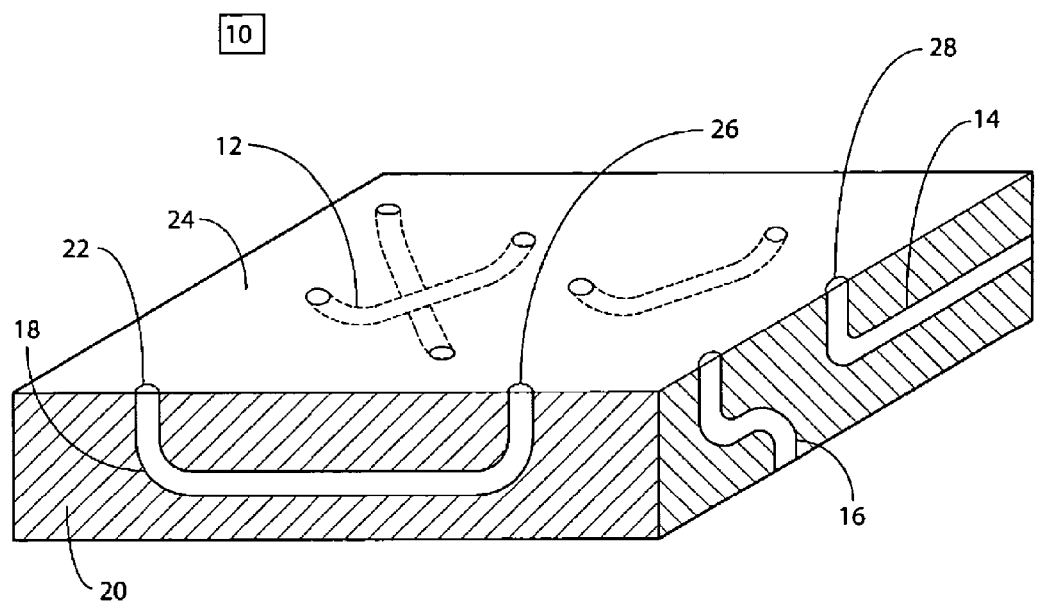

The following description of the preferred embodiments of the invention is not intended to limit the invention to these preferred embodiments, but rather to enable any person skilled in the art to make and use this invention.

The present invention includes decorative, architectural, and building materials and methods of making these materials, using them or both. The light system of the present invention may be used as a sign for pedestrians, vehicles, or bicycles in concrete barriers or abutments, may be used as a display in or on building walls, floors, or ceilings, or may be used in any other suitable environment.

The light system of the present invention includes at least one light pipe in a substrate, where the light pipe transmits light from one location on a first surface of the substrate to another location on the same surface of the substrate, to another surface of the same substrate, to a location on the surface of another substrate, or any combination thereof. The light pipe transmits light from a point along its length to one of its ends on a surface of the substrate. Preferably, the light pipe transmits light from one of its ends to one of its other ends in manner such that the surfaces are connected by light.

In one embodiment of the invention, for the light pipe to transmit light there is a refractive index boundary creating internal reflectance of light within the light pipe, allowing light to be transmitted along at least a portion of the length of the light pipe. The boundary can be formed at the interface of the light pipe material and a substrate. Preferably, the refractive index of the light pipe is higher than then refractive index of the substrate. Alternately or additionally, a coating, sheath or other material on the light pipe can be used to create the refractive index boundary. Alternately or additionally, the boundary can be the result of a physical discontinuity in the light pipe/substrate such as an edge, rim, lip, perimeter or border. In this embodiment, the light pipe may be made from the same material as the substrate or at least from a material with the same refractive index as the substrate. Any combination of these variations may also be employed.

The size and cross-section of the light pipe is limited only by available manufacturing techniques, although typically, the light pipes will have length that is longer than their width, where the length is the distance between the two surfaces connected by the light pipe. The width of the light pipe may be anything from about a micron to about several centimeters. For example, light pipes of about 1 micron, about 5 microns, about 10 microns, about 50 microns, about 100 microns, about 500 microns and about 1000 microns are suitable, as are light pipes of about 2.5 mm, about 5 mm, about 10 mm, about 15 mm, about 20 mm, about 25 mm and about 50 mm. Light pipes are preferably consistent in size over their length, although the aspect may also vary, such that a relatively large light pipe decreases in size over it length or vice versa. The cross-section of the light pipe is preferably circular or rectangular, although any other cross-sections such as stars or hollow tubes are also suitable. Also, light pipes are preferably consistent in cross-section over their length, although this is not necessarily the case, such that a rectangular light pipe morphs into a star cross-section over its length. The transition from one cross-section or size may be gradual or abrupt. In addition, the light pipe may be a film such that it has a width that is substantially larger than its thickness. Further, the use of a film would permit patterns of longitudinal lines in the substrate formed by the light pipes. For example, a sinusoidal line may be formed in the substrate at either or both ends of a light pipe. In addition, several different light pipes of different size, cross-section shape or material may be combined into a larger light pipe.

The shape of the light pipe within the substrate is limited only by the need to have the light pipes transmit light from one point to another along the length of the light pipe. Generally, U-shaped light pipes (when seen in cross-section) are preferred to transmit light from one location on the surface to another location on the same surface. U-shaped light pipes may also be used to transmit light from one surface to a generally parallel surface on the same on another substrate. Other exemplary shapes for light pipes include L-shaped light pipes that would transmit light from one surface to a generally normal surface on the same substrate or another substrate. T-shaped and other branched light pipes may be used to transmit light from one surface to a plurality of locations on surfaces or from a plurality of surfaces to a single location. Also, generally linear light pipes may be used to connect two different surfaces of the same substrate or two otherwise opposed surfaces. Any combination of the above variations is also possible.

In addition, the light pipes of the present invention may be discontinuous along its length meaning that only portions of the light pipe near its ends need to have the refractive index boundary. In this embodiment, the light being transmitted by the light pipe is initially given direction by the refractive index boundary; however, as the light travels along the length of the light pipe, the refractive index boundary ends, causing the light pipe and the substrate to become one. While some leaking of light into the surrounding substrate will inevitably occur, some light will also travel to the other end of the light pipe that has another refractive index boundary. This boundary causes the light to again be directed.

Though light pipes of limited opacity may be employed in certain instances, typically a preferred light pipe will be made of any transparent or otherwise translucent material. Preferably, the material has percentage transmission of at least about 50%; more preferably at least about 75%; and most preferably at least about 90%. Preferably, the material is at least partially amorphous or more preferably is substantially entirely amorphous glass or a plastic such acrylates, methacrylates, polycarbonates, PET, polyesters, polyolefins, nylons, fluoropolymers and combinations thereof and combinations of glasses and plastics. The material may be flexible or rigid. The light pipe may be a tube containing a transparent medium including being the same or different as the substrate material that carries it, whether solid, liquid or gas. The tube may be sealed or open such that the ambient air is the transparent medium. Alternately, the light pipe may be formed from one or more films that are spaced from each other, wherein the space is filled with a transparent material, including, optionally, the substrate material.

The light pipe material may be luminescent. For example, phosphorescent material may be used such that the light pipe material glows in the dark. Alternately, fluorescent material may be used such the light pipe gives off light in the presence of UV light, IR light or some other non-visible light or electromagnetic energy. The light pipe material may be neat or doped to achieve the desired luminescent quality.

In additional, the light pipe material may colored or doped with a colorant or other component to achieve a desired lighting effect. For example, one or more doping agents may be employed to alter the index of refraction, the strength of the light pipe material or the percentage transmission of the light pipe. Further, the light pipe may be doped throughout its length or just a portion or portions thereof or it may be doped throughout its cross-section or just a portion or portions thereof.

Light pipes may also include a coating or sheath (transparent or opaque) designed to protect the light pipe from physical damage (e.g. abrasion) or from chemical attack (e.g. dissolution or infiltration by an undesired agent such as air, oxygen, oil, water, or the like). For example, several light pipes may be combined together into one cable such as a fiber optic cable where one protective sheath surrounds a plurality of light pipes.

One preferred approach is to employ a light pipe material that is recyclable. Thus the invention also contemplates a step of recycling the light pipe at the end of its useful life.

The light pipes may be made according to any conventional technique suitable for the light pipe material including casting, molding, drawing, extruding, glass rod forming or any other suitable film forming technique.

As indicated above, the light pipes are preferably carried in a substrate. The substrate may be made of any material that is compatible with the light pipe material. The substrate material or matrix may be a castable or moldable material, a metal, plastic, ceramic, composite, wood or wood substitute, fiber material for creating a fabric or a laminate (woven or nonwoven), the same material as the light pipe, or any combination thereof. The resultant substrate may be flexible or rigid, transparent or opaque, or hard or soft to the touch. If transparent, the substrate material may have any of the qualities of the light pipes such as being luminescent, for example phosphorescent or fluorescent. Preferred substrates, such as for use in architectural applications, include concrete, or other matrix materials suitable for producing blocks, bricks or tiles, preferably capable of carrying loads, that incorporate at least one light pipe. Other suitable substrates include metals, alloys, plastics, silicones, thermoplastics, thermosets, ceramics, composites, laminates, polyesters, epoxies, and combinations thereof including foams, gelatins and slurries. Suitable fiber materials include natural and synthetic fibers for making clothing, fabrics or other woven or non-woven articles. Fiberglass, wood, fiberboard, other composite materials, and the like are also suitable substrates.

The surfaces including the ends of the light pipes may include surface features such as mounds, hills, other promontories, valleys, grooves, trenches or other basins. The surface features may be regular patterns, such as a sine wave, or irregular. In addition, the surfaces may be micro- or nano-textured to alter the tactile or optical characteristics of the surface, substrate or light pipe.

The light source is preferably a visible light source. The light source preferably includes a control unit to vary the source of the light, the intensity of the light, the wavelength of the light, or any combination thereof or otherwise. Other methods of manipulating the light, such as turning off the light source, are also suitable. Also, the interference with the light may be partial or complete. For example, placing a colored but translucent object between the light pipe and the light source may be used to permit only a specified color of light to be transmitted by the light pipe. Other types light filters may also be used to partially interfere with the light such a polarizing gradients, IR filters, UV filters, etc. and combinations thereof.

The light sources may provide visible, UV, IR or other frequencies of electromagnetic energy. The light sources may be point sources that illuminate only a portion of the substrate or that illuminate only the individual light pipes or broad sources that illuminate the environment generally where the device is placed. The light source may be transient, modulated or stable in its illumination and may utilize a pattern of illumination such as areas of illumination alternating with areas of shadow. The source may be periodic in its illumination or it may be irregular. The light source may stationary, mobile, at rest or in motion. Plural light sources may also be utilized. The light source can also be capable of multiple colors or multiple light sources of single colors can be clustered together so as to create a module capable of blending the basic colors (RGB) to produce a large number of derivative colors.

In one embodiment, the light system and the light source are packaged together. In one variation, the light source may be located near the rigid light pipe unit in an area between adjacent concrete slabs. The light source of this variation may be covered and protected within a serviceable weather resistant housing, by grout or another suitable material, or by any other suitable method or device. In another variation, the light source may be located in a remote area and transmitted to the rigid light pipe unit with suitable devices or methods (such as a fiber optic cable).

The light system of the preferred embodiment also includes a light controller. The light controller functions to control a parameter (such as the brightness, frequency, and/or color) of the light source to display information, recognizable patterns and other signs, indications, warnings etc. The controller may be any suitable device or method to control the light source(s).

The light system of the preferred embodiment may also include a power source, such as a battery, or may include a plug to transmit power from a power grid.

The general method of manufacturing the light system of the present invention includes creating a refractive index boundary between a transparent material and a substrate to form a light transmission path akin to a light pipe within the substrate. The creation of the refractive index boundary may be made by insert molding, injection molding, compression molding, rotational molding, casting, sintering, foam infiltration, impregnation with liquid, selective curing, weaving, laminating, and any combination thereof.

In one preferred method, the refractive index boundary may be made by casting an uncured substrate material with a first refractive index around a transparent material that has a second refractive index. This casting includes both casting the substrate around a pre-formed network of light pipes and embedding light pipes in as of yet uncured mass of substrate. In another preferred method, the refractive index boundary may be made by cutting a light pipe into a mass of transparent material thus making a boundary between the light pipe and the remainder of the mass of transparent material, i.e. the substrate. In another preferred method, the refractive index boundary may be made by incorporating a light pipe into a fabric, whether woven or non-woven of other fibers or of other light pipes. The light pipes may also be incorporated into laminates.

Turning now, in particular, to the accompanying drawings for further illustration, shown in FIG. 1, one embodiment of the light system 10 may include several light pipes 12, 14, 16 and 18 of a transparent material and a round cross section embedded in a substrate 20. Light pipe 18 is shown in cross-section down its length and generally has a U-shape that connects a first location 22 on a first surface 24 of the substrate 20 to a second location 26 on the same surface. Light pipe 14 is shown in cross-section and generally has an L-shape that connects a location 28 on the first surface 24 of the substrate with another location on a second surface of the substrate. Light pipe 16 is shown in cross-section and generally has an S-shape that connects two opposing surfaces of the substrate. As can be seen, the light pipes may overlap each other or be woven together.

The embodiment shown in FIG. 1 may be made by forming a mold in the desired shape, e.g. a floor tile, for the light system, casting the substrate material into the mold and subsequently placing the light pipes in the as yet uncured substrate material. The substrate material is appropriately cured or allowed to cure on its own, provided that any applied cure condition do not unduly adversely effect the light pipes. Alternately, the substrate may be cast about pre-placed light pipes. Such a casting method may be used to pre-fabricate tiles or to cast the tiles in place. In this method, one preferred embodiment, the substrate material expands on curing so as to provide a pre-stressed substrate that has increased strength compared to an un-stressed substrate.

As shown in FIG. 2, in another embodiment, the light system 100 includes light pipes 102 that are of the same material as the substrate 104. The device is formed from a plurality of sections 106 of substrate connected together where each section contains a plurality of light pipes 102. The light pipes of the device, thus, generally run parallel to one another. Exemplary sections of the device 100 are shown in FIGS. 2c and 2d. In this embodiment, the light pipes are formed by cutting into a transparent material. The cuts form a refractive index boundary between the portions of transparent material separated by the cut. Through cuts, partial cuts or combinations thereof may be used to form a section with one or more layers of light pipes in the section. The section shown in FIG. 2c has two layers of light pipes made by two separate partial thickness cuts, while FIG. 2d has a single layers of light pipes made with through cuts. As can be seen, preferably, when through cuts are used, a portion 108 of the transparent material is not cut, preferably near the edge of the transparent material. By not cutting through along the entire length of the light pipe, a connection point is formed so that all the light pipes of the section are held together. These uncut portions also provide physical strength to the light system. The uncut portion may also help to provide a relatively smooth surface to the device. In addition, to the U-shaped light pipes seen in FIGS. 2c and 2d, linear light pipes 110 and L-shaped light pipes 112 may be used, as seen in FIGS. 2e and 2f. Further, the uncut portion 108 need not be at the surface, but may be in the interior.

A variety of known cutting devices and techniques may be used to form the light pipes within the substrate. For example, a computer controlled cutting machine such as CNC using a laser is preferable because of it precision, ease of use and minimal loss of material due to waste. Water jet cutters, routers, grinders and cutters with blades, manually controlled cutting machines, and combinations thereof or the like may also be suitable. In addition, chemical methods may be used such as etching or photo methods such as photolithography.

A variety of known devices and techniques may be used to fasten together the various sections of the substrate. For example, an adhesive may be used, as can mechanical fasteners such nuts-and-bolts, screws, nails, snap-fit connectors, etc. Also, the various sections may be held together in a frame or by a clamp, such that force keeps the sections together as a unit. The light system can be created in a pre-cast or factory environment or it can able be made on site or in situ. The light system can consist of a single assembly, or may consist of multiple assemblies in one rectangular or other substantially flat element like a tile all the way to multiple tiles tied together.

Figure 3:
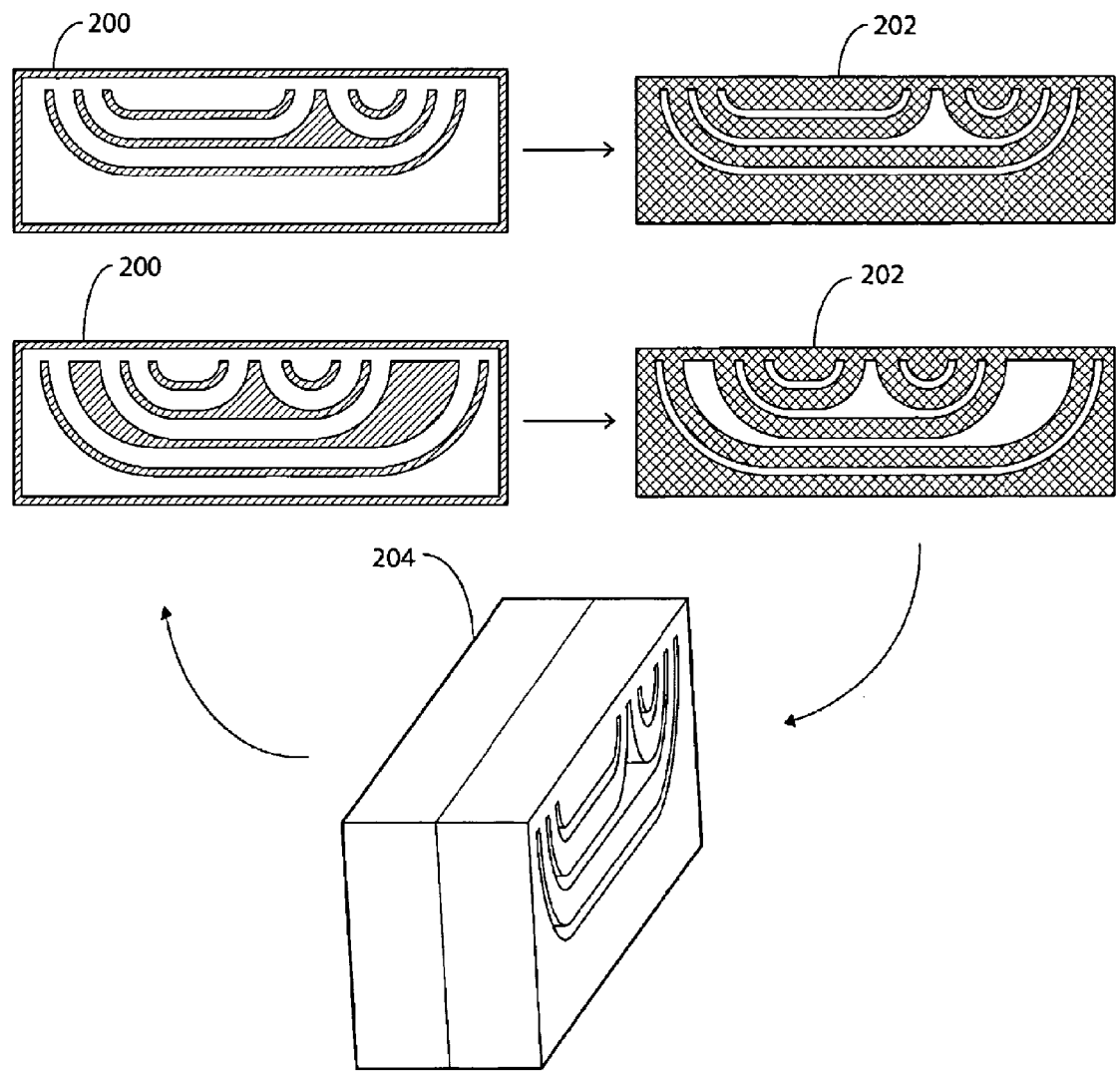

In another embodiment similar to the one shown in FIG. 2, the sections of the substrate may be cast. As seen in FIG. 3, a mold 200 of the section is prepared and into which the casting material of the light pipe is introduced. The casting material may be any suitable castable transparent material including any of the transparent materials discussed above. After curing, the light pipe containing section 202 is removed from the mold 200. Preferably the mold is reusable, though it may be disposable. The cast section may be trimmed or post treated as necessary before being connected together with other sections to form the light system 204. Casting may be preferable to other forms of manufacture because it allows for rapid, repetitive production of sections.

Figure 4:
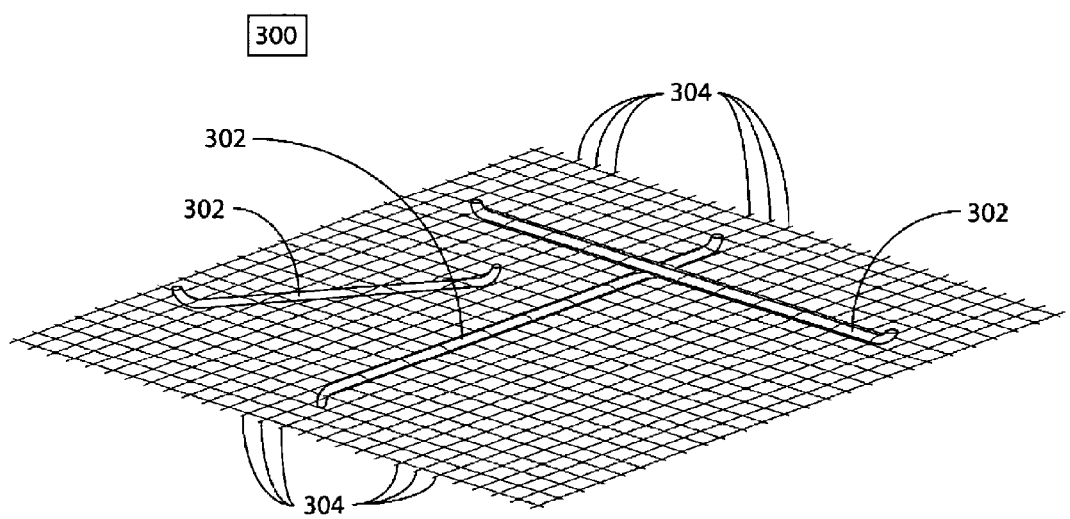
FIG. 4 is a top view of a surface of the substrate (and the ends of the stacked light pipe structure) of the preferred embodiment of the invention.

In another embodiment, as shown in FIG. 4, the light system 300 may include light pipes 302 that are integrated into a substrate of fibers 304. The light pipes are shown as woven with other fibers into a fabric; however, the light pipes may be incorporated with other fibers into a non-woven fabric or into a laminate, e.g. fiberglass.

Figure 5:
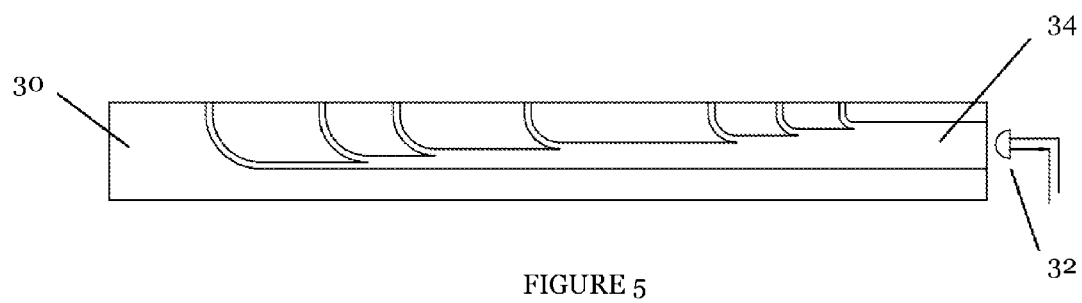
FIGS. 5-8 are cross-sectional views of different variations of the preferred embodiment of the invention.
Figure 6:
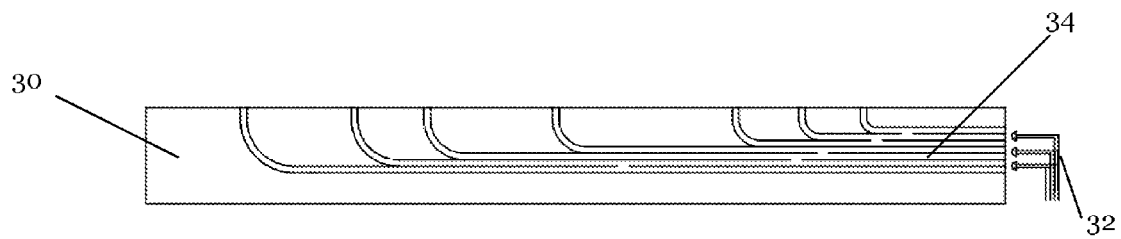
Figure 7:
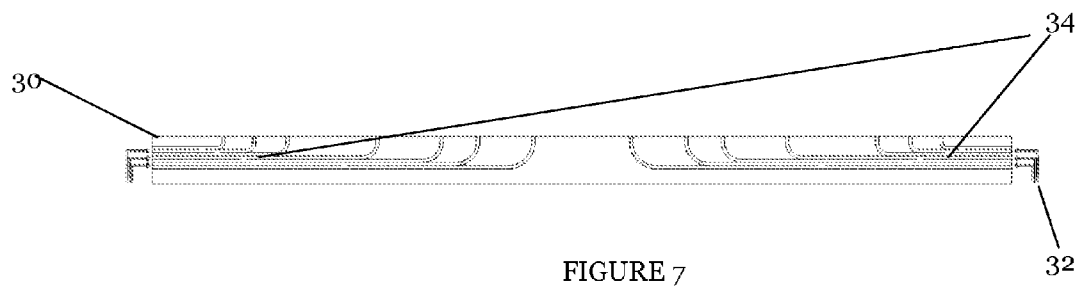

As shown in FIGS. 5-7, the light system of the preferred embodiment includes a substrate 30, a light source 32, and a rigid light pipe unit 34 located in the substrate and adapted to transmit light from the light source to a surface of the substrate.

The light source may be a point source that illuminates several light pipes within the rigid light pipe unit (shown in FIG. 5), or may be a collection of light sources that each individually illuminate a light pipe within the rigid light pipe unit (shown in FIG. 6).

Figure 8:
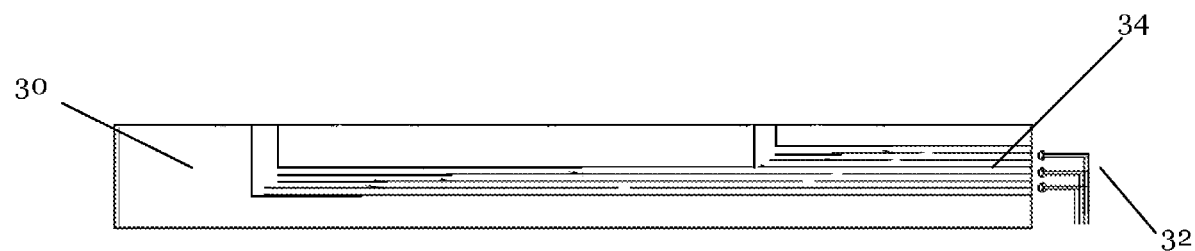

The rigid light pipe unit 34 of the preferred embodiment functions to transmit light from the light source to a surface of the substrate. The rigid light pipe unit 34 is preferably a combination of multiple light pipes that are stacked in one of many possible variations. In the first variation (shown in FIG. 5), multiple light pipes are stacked and merged to transmit light from one light source to multiple points on the surface of the substrate. In this variation, the rigid light pipe unit may include a single branched light pipe. The single branched light pipe initiates at a first end and has a plurality of light pipe branch off towards a plurality of second ends. In a second variation (shown in FIG. 6), multiple light pipes are stacked (but held separate) to transmit light from multiple light sources to multiple points on the surface of the substrate. In a third variation (shown in FIG. 8), multiple light pipes are stacked and merged to transmit light from multiple light sources to one point on the surface of the substrate. In this variation, the rigid light pipe unit may include a single branched light pipe. The single branched light pipe initiates at a plurality of first ends and then merges towards a smaller number of second ends, such that the ratio of first ends and second ends is greater than 1.

The substrate may include a plurality of sections, each containing at least one rigid light pipe unit, coupled together, such that the plurality of sections are coupled together to create a pattern. The rigid light pipe units and/or the sections of the substrate can be repeated periodically in a random or organized manner in both the X and Y direction on the surface of the substrate. The finished assembly can be a recognizable logo, or graphic, a readable letter or other legible information, the pattern can also be a generic "grid" that can be configured through the control of the lighting into different patterns, including information containing images and other legible configurations.

The materials of the present invention may also be used in buildings as pre-fabricated wall, ceiling and flooring tiles, made-in-place tiles, other floor coverings, facade panels, pavers, bricks, siding, roofing, glass and concrete blocks, furniture panels, cabinetry panels, countertops, fabrics, rugs, carpets, wall coverings, room partitions, furniture, upholstery or window treatments (e.g. Venetian blinds). These materials may provide either or both a utility and decorative function to the article into which they are incorporated. For example, these materials may be used to include decorative designs, patterns or graphics integrated into the articles. In addition, these materials may be used in lighting fixtures.

As an example of a use of the invention as an architectural material, the devices may be incorporated into the wall, floor or ceiling of an entranceway. As flooring tiles, the devices may be cast-in-place to create a surface that is suitable for daily use. As wall coverings, the devices may be fabric that is hung like tapestries or the devices may be tiles secured to an underlying surface or structure. As ceiling tiles, the devices may be suspended like a drop ceiling or secured to an underlying surface or structure. With additional light sources such as lamps or windows, the entranceway may provide an aesthetically appealing opening the office, building or residence.

In other embodiments, the materials of the present invention may be use in signage such as pedestrian, vehicle or bicycle activated billboards and signage located in buildings, on buildings, in or on the roadway or sidewalk or located on freestanding supports. The signage may be useful as temporary or permanent displays. Roadway signage and other safety implementations are particularly suitable uses for these materials because the human peripheral vision is quite sensitive to movement. In addition, these materials could be incorporated into concrete barriers or bridge abutments.

The present materials are suitable for water related uses such as in fountains, aquariums, fish tanks, tubs, pools (above ground and in ground), spas and/or Jacuzzis. The materials may be suitable for use in dinnerware, glassware and/or silverware. The present materials may be used as containers or cases for other objects such as retail product containers and computer cases. Fabrics incorporating these materials may be made to any of the known uses for fabrics including as clothing.

One particularly suitable use for the present materials is in mouse pads for optical mice.

It will be further appreciated that functions or structures of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

I claim:

1. A light system comprising:
a light source;
a substrate;
at least one refractive index boundary formed by at least one discontinuity in the substrate; and
wherein the substrate is adapted to receive a light input from the light source at a plurality of input locations and to transmit the light output though the substrate to a plurality of output locations;
wherein the input locations have a first spatial relationship to one another, wherein the output locations have a second spatial relationship to one another, and wherein the first spatial relationship is different from the second spatial relationship thereby scrambling light from the light source received at the input locations and transmitted to the output locations.

2. The light system of claim 1 wherein the light source includes a plurality of light sources.

3. The light system of claim 1 wherein the light source provides a light input of a plurality of colors.

4. The light system of claim 1 wherein the refractive index boundary is adapted to alter the direction of the light in the substrate such that a light input is received by the substrate at an input location and the refractive index boundary alters the direction of the light input such that the substrate transmits the light to an output location.

5. The light system of claim 1 wherein the discontinuity is selected from the group consisting of a through cut, a partial cut, an edge, a rim, a lip, a perimeter, and a border.

6. The light system of claim 1 wherein the substrate includes a first surface, and wherein both the plurality of input locations and the plurality of output locations are on the first surface.

7. The light system of claim 1 wherein the substrate includes a first surface and a second surface, and wherein at least a portion of the plurality of input locations is on the first surface and at least a portion of the plurality of output locations are on the second surface.

8. The light system of claim 7 wherein the second surface is opposite the first surface.

9. The light system of claim 8 wherein the substrate has multiple sides, wherein each of the sides defines a surface area, wherein the first surface is one of the two sides with the largest surface area.

10. The light system of claim 1 wherein the light source is covered and protected.

11. A light system comprising:
a light source;
a substrate including a plurality of sections coupled together; and
at least one refractive index boundary formed by at least one discontinuity in at least one section of the substrate;
wherein the substrate is to receive a light input from the light source at a plurality of input locations and to transmit the light output to a plurality of locations;
wherein the input locations have a first spatial relationship to one another, wherein the output locations have a second spatial relationship to one another, and wherein the first spatial relationship is different from the second spatial relationship thereby scrambling light from the light source received at the input locations and transmitted to the output locations.

12. The light system of claim 11 wherein the substrate is transparent.

13. The light system of claim 11 wherein a refractive index boundary is defined by at least one first cut in the section.

14. The light system of claim 13 wherein a second refractive index boundary is defined by at least one second cut in the same section.

15. The light system of claim 14 wherein a third refractive index boundary is defined by at least one third cut in the same section.

16. A light system comprising:
a light source that provides a light input;
a substrate that receives a light input from an input location and transmits the light output through the substrate to an output location;
a first refractive index boundary formed by a first discontinuity in the substrate that is located at a first distance from the input location; and
a second refractive index boundary formed by a second discontinuity in the substrate that is located at a second distance from the input location, wherein the second distance is different from the first distance;
wherein the substrate receives the light input at the input location on the substrate, the light is transmitted though the substrate to the first refractive index boundary, the first refractive index boundary deflects the light toward the second refractive index boundary, the light is transmitted though the substrate through the second distance to the second refractive index boundary, the second refractive index boundary deflects the light toward an output location on the substrate, and the light output is transmitted to the output location.

17. The light system of claim 16 wherein the first and second discontinuities are cuts in the substrate that each form a refractive index boundary between the portions of substrate separated by the cut.

18. The light system of claim 17 wherein the first and second discontinuities are cuts that each form a refractive index boundary at a first angle from a surface of the substrate, wherein the first angle is one of 45 degrees and 135 degrees.

19. The light system of claim 18 further including a third discontinuity that forms a third refractive index boundary at a second angle from the same surface of the substrate at a third distance from the input location, wherein the second is substantially identical to the first angle and the third distance is different from the second distance.

20. The light system of claim 19 wherein the substrate receives the light input at the input location on the substrate; the light is transmitted though the substrate to the first refractive index boundary; the first refractive index boundary deflects the light toward the second and third refractive index boundaries; wherein the first refractive index boundary deflects a portion of the light toward the second refractive index boundary, the light is transmitted through the substrate through the second distance, and the second refractive index boundary deflects the light toward a first output location on the substrate; and the first refractive index boundary deflects another portion of the light toward the third refractive index boundary, the light is transmitted through the substrate through the third distance, and the third refractive index boundary deflects the light toward a second output location on the substrate; and the light output is transmitted to the first and second output locations.

* * * * *

UNITED STATES PATENT AND TRADEMARK OFFICE
CERTIFICATE OF CORRECTION

| | | |
|---|---|---|
| PATENT NO. | : 7,988,324 B2 | Page 1 of 1 |
| APPLICATION NO. | : 12/482331 | |
| DATED | : August 2, 2011 | |
| INVENTOR(S) | : Abhinand Lath | |

It is certified that error appears in the above-identified patent and that said Letters Patent is hereby corrected as shown below:

Col. 9 in Claim 7, line 5, "are on the second surface." should read --is on the second surface--

Signed and Sealed this
Eighth Day of November, 2011

David J. Kappos
*Director of the United States Patent and Trademark Office*